United States Patent [19]

Zones

[11] Patent Number: 4,508,837

[45] Date of Patent: Apr. 2, 1985

[54] ZEOLITE SSZ-16

[75] Inventor: Stacey I. Zones, San Francisco, Calif.

[73] Assignee: Chevron Research Company, San Francisco, Calif.

[21] Appl. No.: 425,786

[22] Filed: Sep. 28, 1982

[51] Int. Cl.³ .................... C01B 33/26; B01J 29/28
[52] U.S. Cl. ..................... 502/62; 423/326; 423/328; 423/329; 502/60; 502/64; 502/65; 502/66; 502/71; 502/77
[58] Field of Search ............ 252/431 N, 455 Z; 423/326, 328, 329

[56] References Cited

U.S. PATENT DOCUMENTS

| | | | |
|---|---|---|---|
| 3,459,676 | 8/1969 | Kerr | 423/328 |
| 3,692,470 | 9/1972 | Ciric | 423/328 |
| 3,832,449 | 8/1974 | Rosinski et al. | 423/328 |
| 3,950,496 | 4/1976 | Ciric | 423/328 |
| 4,018,870 | 4/1977 | Whittam | 423/329 |
| 4,061,717 | 12/1977 | Kerr | 423/329 |
| 4,116,813 | 9/1978 | Rubin et al. | 423/328 |
| 4,285,922 | 8/1981 | Audeh et al. | 423/329 |
| 4,331,643 | 5/1982 | Rubin et al. | 423/329 |
| 4,372,930 | 2/1983 | Short et al. | 423/326 |

*Primary Examiner*—Edward J. Meros
*Attorney, Agent, or Firm*—S. R. La Paglia; W. L. Stumpf; V. J. Cavalieri

[57] ABSTRACT

A crystalline zeolite, SSZ-16, is prepared from organic nitrogen-containing species derived from 1,4-di(1-azoniabicyclo[2.2.2]octane) lower alkane compounds.

10 Claims, No Drawings

ZEOLITE SSZ-16

TECHNICAL FIELD

Natural and synthetic aluminosilicates are important and useful compositions. Many of these aluminosilicates are porous and have definite, distinct crystal structures as determined by X-ray diffraction. Within the crystals are a large number of cavities and pores whose dimensions and shapes vary from zeolite to zeolite. Variations in pore dimensions and shapes cause variations in the adsorptive and catalytic properties of the zeolites. Only molecules of certain dimensions and shapes are able to fit into the pores of a particular zeolite while other molecules of larger dimensions or different shapes are unable to penetrate the zeolite crystals.

Because of their unique molecular sieving characteristics, as well as their potentially acidic nature, zeolites are especially useful in hydrocarbon processing as adsorbents, and, as catalysts for cracking, reforming, and other hydrocarbon conversion reactions. Although many different crystalline aluminosilicates have been prepared and tested, the search for new zeolites which can be used in hydrocarbon and chemical processing continues.

I have discovered a novel family of crystalline aluminosilicate zeolites, hereinafter designated "Zeolite SSZ-16" or simple "SSZ-16", and methods for their preparation and use.

In recent years, many crystalline aluminosilicates having desirable adsorption and catalytic properties have been prepared. Typically, zeolites are prepared from reaction mixtures having sources of alkali or alkaline earth metal oxides, silica, and alumina. More recently, "nitrogenous zeolites" have been prepared from reaction mixtures containing an organic species, usually a nitrogen compound. Depending upon the reaction conditions and the composition of the reaction mixture, different zeolites can be formed even if the same organic species are used. For example, zeolites ZK-4, ZSM-4, faujasite and PHI, have all been prepared from solutions containing tetramethylammonium cations.

Although most experiments reported as producing nitrogenous zeolites have used fairly simple organic species such as tetraalkylammonium cations or alkylenediamines, several experiments are reported as using more complex organic species. U.S. Pat. No. 3,692,470, Ciric, Sept. 19, 1972, discloses preparing ZSM-10 from 1,4-dimethyl-1,4-diazoniabicyclo[2.2.2-]octane. U.S. Pat. No. 3,832,449, Rosinski et al., Aug. 27, 1974, discloses preparing ZSM-12 from the reaction products of alkylene dihalides with complex amines or nitrogen heterocycles. U.S. Pat. No. 3,950,496, Ciric, Apr. 13, 1976, discloses preparing ZSM-18 from "tris" ammonium hydroxide (1,3,4,6,7,9-hexahydro-2,2,5,5,8,8-hexamethyl-2H-benzo-[1,2-C:3,4-C':5,6-C"]tripyrolium trihydroxide). U.S. Pat. No. 4,018,870, Whittam, Apr. 19, 1977, discloses preparing AG5 and AG6 using nitrogenous basic dyes. And, U.S. Pat. No. 4,285,922, Audeh, Aug. 25, 1981, discloses preparing ZSM-5 using 1-alkyl, 4 aza, 1-azonia-bicyclo[2.2.2]-octane, 4-oxide halides.

TECHNICAL DISCLOSURE

My invention is a zeolite having a mole ratio of an oxide selected from silicon oxide, germanium oxide, and mixtures thereof to an oxide selected from aluminum oxide, gallium oxide, and mixtures thereof greater than about 5:1 and having the X-ray diffraction lines of Table 1. The zeolite further has a composition, as synthesized and in the anhydrous state, in terms of mole ratios of oxides as follows: (0.5 to 1.4)$R_2O$:(0 to 0.50)$M_2O$:$W_2O_3$:(greater than 5)$YO_2$ wherein M is an alkali metal cation, W is selected from aluminum, gallium, and mixtures thereof, Y is selected from silicon, germanium and mixtures thereof, and R is an organic cation. SSZ-16 zeolites can have a $YO_2$:$W_2O_3$ mole ratio greater than about 5:1. As prepared, the silica:alumina mole ratio is typically in the range of 8:1 to about 15:1. Higher mole ratios can be obtained by treating the zeolite with chelating agents or acids to extract aluminum from the zeolite lattice. The silica:alumina mole ratio can also be increased by using silicon and carbon halides and other similar compounds. Preferably, SSZ-16 is an aluminosilicate wherein W is aluminum and Y is silicon.

My invention also involes a method for preparing SSZ-16 zeolites, comprising preparing an aqueous mixture containing sources of an organic nitrogen-containing compound, an oxide selected from aluminum oxide, gallium oxide, and mixtures thereof, and an oxide selected from silicon oxide, germanium oxide, and mixtures thereof, and having a composition, in terms of mole ratios of oxides, falling within the following ranges: $YO_2/W_2O_3$, 5:1 to 350:1; and $R_2O/W_2O_3$ 0.5:1 to 40:1; wherein Y is selected from silicon, germanium, and mixtures thereof, W is selected from aluminum, gallium and mixtures thereof, and R is an organic cation; maintaining the mixture at a temperature of at least 100° C. until the crystals of said zeolite are formed; and recovering said crystals.

SSZ-16 zeolites, have a crystalline structure whose X-ray powder diffraction pattern shows the following characteristic lines:

TABLE 1

| 2 $\theta$ | d(A) | Relative Intensity 100 $I/I_o$) |
|---|---|---|
| 7.52 | 11.76 | 35 |
| 8.72 | 10.14 | 85 |
| 11.59 | 7.63 | 50 |
| 15.71 | 5.64 | 60 |
| 17.48 | 5.07 | 68 |
| 17.66 | 5.02 | 50 |
| 20.46 | 4.34 | 100 |
| 21.85 | 4.07 | 95 |
| 27.68 | 3.223 | 68 |
| 30.68 | 2.914 | 70 |

Typical SSZ-16 aluminosilicate zeolites have the complete X-ray diffraction pattern of Table 3, 4, or 5.

The X-ray powder diffraction patterns were determined by standard techniques. The radiation was the K-alpha/doublet of copper and a scintillation counter spectrometer with a strip-chart pen recorder was used. The peak heights I and the positions, as a function of 2 $\theta$ where $\theta$ is the Bragg angle, were read from the spectrometer chart. From these measured values, the relative intensities, 100 $I/I_0$, where $I_0$ is the intensity of the strongest line or peak, and d, the interplanar spacing in Angstroms corresponding to the recorded lines, can be calculated. The X-ray diffraction pattern of Table 1 is characteristic of SSZ-16. The zeolite produced by exchanging the metal or other cations present in the zeolite with various other cations yields substantially the same diffraction pattern although there can be minor shifts in interplanar spacing and variations in relative intensity. Minor variations in the diffraction pattern can also result from variations in the organic compound used in the preparation and from variations in the silica-to-alumina mole ratio from sample to sample. Calcination can also cause minor shifts in the X-ray diffraction pattern. Notwithstanding these minor perturbations, the basic crystal lattice structure remains unchanged.

SSZ-16 zeolites can be suitably prepared from an aqueous solution containing sources of an alkali metal oxide, an organic compound, an oxide of aluminum or gallium, or mixture of the two, and an oxide of silicon or germanium, or mixture of the two. The reaction mixture should have a composition in terms of mole ratios of oxides falling within the following ranges:

|  | Broad | Preferred |
| --- | --- | --- |
| $YO_2/W_2O_3$ | 5–350 | 12–200 |
| $M_2O/W_2O_3$ | 0.5–20 | 1–17 |
| $R_2O/W_2O_3$ | 0.5–40 | 5–25 |
| $MCl/W_2O_3$ | 20–200 | 50–150 |
| $OH^-/YO_2$ | >0.95 | 0.95–1.10 | wherein R is as disclosed below, Y is silicon, germanium or both, and W is aluminum, gallium or both. M is an alkali metal, preferably sodium. Typically, an alkali metal hydroxide or alkali metal halide is used in the reaction mixture; however, these components can be omitted so long as the equivalent basicity is maintained. The organic compound can provide hydroxide ion.

The organic component of the crystallization mixture is typically a bicyclo heteroatom compound. The heteroatom can be nitrogen or phosphorus. The preferred organic species are derivatives of 1,4-di(1-azoniabicyclo[2.2.2]octane) lower alkanes, wherein the lower alkane portion of the organic compound has from 3–5 carbon atoms. The most preferred organic species are 1,4-di(1-azoniabicyclo[2.2.2]octane)butane compounds, especially the butyl dihalides.

The reaction mixture is prepared using standard zeolitic preparation techniques. Typical sources of aluminum oxide for the reaction mixture include aluminates, alumina, and aluminium compounds such as $AlCl_3$ and $Al_2(SO_4)_3$. Typical sources of silicon oxide include silicates, silica hydrogel, silicic acid, colloidal silica, tetraalkyl orthosilicates, and silica hydroxides. Gallium and germanium can be added in forms corresponding to their aluminum and silicon counterparts. Salts, particularly alkali metal halides such as sodium chloride, can be added to or formed in the reaction mixture. They are disclosed in the literature as facilitating the crystallization of zeolites while preventing silica occlusion in the lattice.

The reaction mixture is maintained at an elevated temperature until the crystals of the zeolite are formed. The temperatures during the hydrothermal crystallization step are typically maintained from about 100° C. to about 235° C., preferably from about 120° C. to about 200° C. and most preferably from about 130° C. to about 165° C. The crystallization period is typically greater than 3 days and preferably from about 7 days to about 50 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, SSZ-16 zeolite crystals. The drying step can be performed at atmospheric or subatmospheric pressures.

During the hydrothermal crystallization step, the SSZ-16 crystals can be allowed to nucleate spontaneously from the reaction mixture. The reaction mixture can also be seeded with SSZ-16 crystals both to direct and accelerate the crystallization, as well as to minimize the formation of undesired aluminosilicate contaminants. If the reaction mixture is seeded with SSZ-16 crystals, the concentration of the organic compound can be greatly reduced or eliminated, but it is preferred to have some organic compound present, e.g., an alcohol.

The synthetic SSZ-16 zeolites can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA, or dilute acid solutions to increase the silica:alumina mole ratio. The zeolite can also be steamed; steaming stabilizes the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. And, the metals can be occluded in the crystal lattice by having the desired metals present as ions in the reaction mixture from which the SSZ-16 zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structure.

The SSZ-16 aluminosilicate can be formed into a wide variety of physical shapes. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion precesses. Such matrix materials include active and inactive materials and synthetic or naturally occurring zeolites as well as inorganic materials such as clays, silica and metal oxides. The latter may occur naturally or may be in the form of gelatinous precipitates, sols or gels including mixtures of silica and metal oxides. Use of an active material in conjuction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the synthetic zeolites of this invention include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the SSZ-16 zeolites can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The SSZ-16 zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix.

SSZ-16 zeolites are useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, and olefin and aromatics formation reactions. The catalysts are useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., ortho xylene), and disproportionating aromatics (e.g., toluene) to provide a mixture of benzene, xylenes and higher methylbenzenes. The SSZ-16 catalysts have high selectivity, and under hydrocarbon conversion conditions can provide a high percentage of desired products relative to total products.

SSZ-16 zeolites can be used in processing hydrocarbonaceous feedstocks. Hydrocarbonaceous feedstocks contain carbon compounds and can be from many different sources, e.g., virgin petroleum fractions, recycle petroleum fractions, shale oil, liquefied coal, tar sand oil, and in general any carbon containing fluid susceptible to zeolitic catalytic reactions. Depending on the type of processing the hydrocarbonaceous feed is to undergo, the feed can be metal containing or without metals, it can also have high or low nitrogen or sulfur impurities. It can be appreciated, however, that in general processing will be more efficient (and the catalyst more active) the lower the metal, nitrogen or sulfur content of the feedstock.

The conversion of hydrocarbonaceous feeds can take place in any convenient mode, for example, in fluidized bed, moving bed, or fixed bed reactors depending on the type of process desired. The formulation of the catalyst particles will vary depending on the conversion process and method of operation.

Using SSZ-16 catalysts which contain hydrogenation components, heavy petroleum residual stocks, cyclic stocks, and other hydrocrackable charge stocks can be hydrocracked at temperatures from 175° C. to 485° C. using molar ratios of hydrogen to hydrocarbon charge from 1 to 100. The pressure can vary from 0.5 to 350 bar and the liquid hourly space velocity from 0.1 to 30. For these purposes, the SSZ-16 catalyst can be composited with mixtures of inorganic oxide supports as well as with faujasites such as X and Y.

Hydrocarbon cracking stocks can be catalytically cracked using SSZ-16 at liquid hourly space velocities from 0.5 to 50, temperatures from about 260° C. to 625° C., and pressures from subatmospheric to several hundred atmospheres.

SSZ-16 can be used to dewax hydrocarbonaceous feeds by selectively removing straight chain paraffins. The process conditions can be those of hydrodewaxing—a mild hydrocracking—or they can be at lower pressures in the absence of hydrogen. Dewaxing in the absence of hydrogen at pressures less than 30 bar, and preferably less than 15 bar, is preferred as significant amounts of olefins can be obtained from the cracked paraffins.

SSZ-16 can also be used in reforming reactions using temperatures from 315° C. to 595° C., pressures from 30 to 100 bar, and liquid hourly space velocities from 0.1 to 20. The hydrogen to hydrocarbon mole ratio can be generally from 1 to 20.

The catalyst can also be used to hydroisomerize normal paraffins, when provided with a hydrogenation component, e.g., platinum. Hydroisomerization is carried out at temperatures from 90° C. to 370° C., and liquid hourly space velocities from 0.01 and 5. The hydrogen to hydrocarbon mole ratio is typically from 1:1 to 5:1. Additionally, the catalyst can be used to isomerize and polymerize olefins using temperatures from 0° C. to 260° C.

Other reactions which can be performed using the catalyst of this invention containing a metal, e.g., platinum, include hydrogenation-dehydrogenation reactions, denitrogenation and desulfurization reactions.

SSZ-16 can be used in hydrocarbon conversion reactions with active or inactive supports, with organic or inorganic binders, and with and without added metals. These reactions are well known to the art as are the reaction conditions.

SSZ-16 can also be used as an adsorbent, as a filler in paper, paint, and toothpastes, and as a water-softening agent in detergents.

EXAMPLES

Example 1

The organic species 1,4-di(1-azoniabicyclo[2.2.2]octane)butyl dibromide was prepared using standard techniques. 1-azabicyclo[2.2.2]octane was reacted with 1,4-dibromobutane according to the following procedure:

Six grams (0.054 mole) of quinuclidine (1-azabicyclo[2.2.2]octane) was dissolved in 18 ml of absolute ethanol. With cooling, 1,4 dibromobutane (5.4 gms, 0.025 mole) was added dropwise and the solution stirred. With overnight stirring, the solution became extremely thick as white solids precipitated out. The product was filtered and washed with acetone and then ether. The resulting salt dissolved in $H_2O$ but not $CHCl_3$ or ethanol. C, H, N analysis was correct for the desired template, 1,4-di(1-azoniabicyclo[2.2.2]octane) butyl dibromide.

Example 2

1.89 gms of the template from Example 1 was dissolved in 6 mls $H_2O$ and mixed with 5 grams of Banco sodium silicate solution (38.3% solids, $SiO_2$:$Na_2O$ = 3.22) in the teflon cup of a #4745 Parr reactor. A second solution containing 0.25 gms of $Al_2(SO_4)_3\cdot18H_2O$ and 0.67 gm of concentrated NaOH dissolved in 6 ml $H_2O$ was stirred into the cup. The reactor was sealed and heated under autogeneous pressure for 6 days at 140° C. Upon cooling the reactor, a fine white solid was collected by filtration and washed. The product had the essential lines of SSZ-16 in X-ray diffraction analysis.

Example 3

The product of Example 2 was heated under low partial pressure air in $N_2$ in a stepped cycle of 93° C.-2 hrs., 204° C.-2 hrs., 316° C.-2 hrs., 427° C.-2 hrs. and 538° C.-3 hrs. The calcined product was submitted for absorption analysis and had a surface area of 532 $m^2$/gm with a pore size distribution of all micropore filling.

Example 4

9.70 grams of the product of Example 1 was mixed in 30 mls $H_2O$ with 25 grams of the Banco sodium silicate solution (38.3% solids, $SiO_2$:$Na_2O$ = 3.22). A second solution of 1.25 grams of $Al_2(SO_4)_3\cdot18H_2O$ and 3.35 grams of concentrated NaOH in 30 mls of $H_2O$ was added to the first with mixing and the resulting solution was placed in the teflon cup of a Parr #4747, 125 ml reactor. The solution was aged at room temperature for 18 hours and then heated to 140° C. for 6 days. After cooling, the solids were recovered by filtration and were washed. The X-ray diffraction pattern was that of SSZ-16 with small amounts of impurities.

Table 2 gives additional examples of SSZ-16 synthesis using the procedure and reactants of Example 2 (all weights are in grams). The reaction mixtures of Examples 7-9 were stirred.

TABLE 2

| Example | 5 | 6 | 7 | 8 | 9 |
|---|---|---|---|---|---|
| 1st Solution: | | | | | |
| Sodium Silicate Solution | 5 | 5 | 60 | 60 | 60 |
| Template of Ex. 1 | 5 | 2 | 24 | 24 | 24 |
| $H_2O$ (ml) | 6 | 6 | 72 | 72 | 72 |
| 2nd Solution: | | | | | |
| $H_2O$ (ml) | 6 | 6 | 72 | 72 | 72 |
| $Al_2(SO_4)_3\cdot18H_2O$ | 0.50 | 0.50 | 6.00 | 6.00 | 6.00 |
| Concentrated NaOH (g) | 0.85 | 0.70 | 10.2 | 10.2 | 10.2 |
| RPM | — | — | 30 RPM | 30 RPM | 30 RPM |
| Temperature | 140° C. | 140° C. | 140° C. | 140° C. | 140° C. |
| Time | 6 days | 6 days | 3 days | 6 days | 7 days |
| Product by XRD | SSZ-16 trace Mordenite | SSZ-16 | SSZ-16 (50%) cubic P (50%) | SSZ-16 | SSZ-16 |

The X-ray diffraction pattern of the product of Example 8 is given in Table 3 and that of Example 9 (uncalcined), in Table 4.

TABLE 3

| 2 θ | Int. | 100 × $I/I_o$ | d/n |
|---|---|---|---|
| 7.53 | 12 | 32 | 11.74 |
| 8.73 | 30 | 81 | 10.13 |
| 11.60 | 17 | 46 | 7.63 |
| 13.07 | 5 | 14 | 6.77 |
| 15.08 | 8 | 22 | 5.87 |
| 15.70 | 23 | 62 | 5.64 |
| 15.84 | 18 | 49 | 5.60 |
| 17.49 | 25 | 68 | 5.07 |
| 17.67 | 20 | 54 | 5.02 |
| 18.34 | 2 | 5 | 4.84 |
| 19.23 | 2 | 5 | 4.62 |
| 19.98 | 7 | 19 | 4.44 |
| 20.48 | 37 | 100 | 4.34 |
| 21.86 | 35 | 95 | 4.07 |
| 22.70 | 8 | 22 | 3.917 |
| 23.41 | 12 | 32 | 3.800 |
| 26.07 | 22 | 59 | 3.418 |
| 26.26 | 9 | 24 | 3.394 |
| 26.88 | 2 | 5 | 3.317 |
| 27.69 | 25 | 68 | 3.222 |
| 28.80 | 4 | 11 | 3.100 |
| 30.00 | 6 | 16 | 2.979 |
| 30.70 | 27 | 73 | 2.912 |

TABLE 4

| 2 θ | Int. | 100 × I/I₀ | d/n |
|---|---|---|---|
| 7.50 | 16 | 38 | 11.79 |
| 8.70 | 38 | 90 | 10.16 |
| 11.58 | 22 | 52 | 9.64 |
| 13.02 | 7 | 17 | 6.80 |
| 15.08 | 10 | 24 | 5.87 |
| 15.72 | 24 | 57 | 5.64 |
| 17.48 | 28 | 67 | 5.07 |
| 17.65 | 20 | 48 | 5.02 |
| 18.33 | 2 | 5 | 4.84 |
| 19.22 | 2 | 5 | 4.62 |
| 19.98 | 9 | 21 | 4.44 |
| 20.45 | 42 | 100 | 4.34 |
| 21.84 | 41 | 98 | 4.07 |
| 22.68 | 10 | 24 | 3.920 |
| 23.38 | 13 | 31 | 3.805 |
| 26.06 | 13 | 31 | 3.419 |
| 26.27 | 10 | 24 | 3.392 |
| 26.88 | 3 | 7 | 3.317 |
| 27.68 | 28 | 67 | 3.223 |
| 28.77 | 4 | 10 | 3.103 |
| 29.95 | 8 | 19 | 2.983 |
| 30.66 | 26 | 62 | 2.916 |

A sample of the product of Example 9 was calcined, ion-exchanged, and recalcined using the procedure of Example 10. The calcined, ion-exchanged product had the x-ray diffraction lines of Table 5.

TABLE 5

| 2 θ | Int. | 100 × I/I₀ | d/n |
|---|---|---|---|
| 7.50 | 11.79 | 4 | 10 |
| 8.76 | 10.10 | 24 | 60 |
| 11.72 | 7.55 | 40 | 100 |
| 13.00 | 6.81 | 26 | 65 |
| 15.02 | 5.90 | 3 | 8 |
| 15.70 | 5.65 | 11 | 28 |
| 17.50 | 5.07 | 8 | 20 |
| 17.98 | 4.83 | 20 | 50 |
| 19.90 | 4.46 | 7 | 18 |
| 20.36 | 4.36 | 31 | 78 |
| 21.90 | 4.06 | 35 | 88 |
| 23.80 | 3.74 | 8 | 20 |
| 26.18 | 3.40 | 15 | 38 |
| 28.18 | 3.17 | 21 | 52 |
| 30.24 | 2.96 | 11 | 28 |
| 30.62 | 2.92 | 19 | 48 |

Example 10

A sample of the product of Example 8, was calcined following the procedure of Example 3. The zeolite was then ion-exchanged three times with a molar excess of $NH_4NO_3$ at 100° C. in a closed system for 2 hours. After drying the zeolite, it was then calcined following the procedure of Example 3. A constraint index test was performed using a 50/50 mixture of 3-methyl pentane and n-hexane, space velocity of 1, and 371° C. The constraint index was determined to be above 75. This indicates SSZ-16 is a small pore zeolite.

What is claimed is:

1. A zeolite having a mole ratio of an oxide selected from silicon oxide, germanium oxide and mixtures thereof to an oxide selected from aluminum oxide, gallium oxide, and mixtures thereof greater than about 5:1, and having the X-ray diffraction lines of Table 1.

2. A zeolite having a composition, as synthesized and in the anhydrous state, in terms of mole ratios of oxides as follows: (0.5 to 1.0)$R_2O$:(0 to 0.50)$M_2O$:$W_2O_3$: (greater than 5) $YO_2$ wherein M is an alkali metal cation, W is selected from aluminum, gallium and mixtures thereof, Y is selected from silicon, germanium and mixtures thereof, R is a 1,4-di(1-azoniabicyclo[2.2.2]octane) butyl dihalide, and having the X-ray diffraction lines of Table 1.

3. A composition according to claim 1 wherein W is aluminum and Y is silicon.

4. A zeolite prepared by thermally treating the zeolite of claim 3, at a temperature from about 200° C. to 820° C.

5. A composition according to claim 1 wherein said mole ratio is from about 8:1 to 15:1.

6. A composition according to claim 1 or 2 which has undergone ion exchange with hydrogen, ammonium, rare earth metal, Group IIA metal, or Group VIII metal ions.

7. A composition according to claim 1 or 2 wherein rare earth metals, Group IIA metals, or Group VIII metals are occluded in the zeolite.

8. A composition of matter, comprising the zeolite of claim 1 or 2 and an inorganic matrix.

9. A method for preparing the zeolite of claim 1, comprising:
   (a) preparing an aqueous mixture containing sources of an organonitrogen compound, an oxide selected from aluminum oxide, gallium oxide, and mixtures thereof, and an oxide selected from silicon oxide, germanium oxide, and mixtures thereof, the aqueous mixture having the following composition in terms of mole ratio of oxides:

$YO_2/W_2O_3 = 5-350$ $M_2O/W_2O_3 = 0.5-20$ $R_2O/W_2O_3 = 0.5-40$ $MCl/W_2O_3 = 20-200$ wherein Y is silicon, germanium or mixtures thereof, W is aluminum, gallium or mixtures thereof, M is an alkali metal, and R is a 1,4-di(1-azoniabicyclo[2.2.2]octane)butyl dihalide, and wherein said aqueous mixture has a mole ratio of $OH^-/YO_2$ of greater than 0.95;
   (b) maintaining the mixture at a temperature of from about 100° C. to about 235° C. until the crystals of said zeolite form; and
   (c) recovering said crystals.

10. The method according to claim 9 wherein the aqueous mixture has a composition in terms of mole ratios of oxides falling in the ranges: $YO_2/W_2O_3$, 5:1 to 350:1; $R_2O/W_2O_3$, 0.5:1 to 40:1; wherein Y is selected from silicon, germanium and mixtures thereof, W is selected from aluminum, gallium, and mixtures thereof, and R is a 1,4-di(1-azoniabicyclo[2.2.2]octane)butyl dihalide.

* * * * *

UNITED STATES PATENT AND TRADEMARK OFFICE
CERTIFICATE OF CORRECTION

PATENT NO.   : 4,508,837
DATED        : April 2, 1985
INVENTOR(S)  : Stacey I. Zones It is certified that error appears in the above-identified patent and that said Letters Patent are hereby corrected as shown below:

Col. 2, line 18, "involes" should read ---involves---.

Col. 2, line 33, "SSZ-16 zeolites, have" should read
---SSZ-16 zeolites, as synthesized, have---.

Signed and Sealed this

Ninth Day of July 1985

[SEAL]

Attest:

DONALD J. QUIGG

Attesting Officer     Acting Commissioner of Patents and Trademarks